July 11, 1933. S. TAKECHI Re. 18,893

METHOD FOR CONCRETE PILING

Original Filed Feb. 20, 1928

Shojiro Takechi INVENTOR

BY

Thomas Howe ATTORNEY

Reissued July 11, 1933 Re. 18,893

UNITED STATES PATENT OFFICE

SHOJIRO TAKECHI, OF OSAKA, JAPAN

METHOD FOR CONCRETE PILING

Original No. 1,792,333, dated February 10, 1931, Serial No. 255,731, filed February 20, 1928, and in Japan March 19, 1927. Application for reissue filed October 25, 1932. Serial No. 639,506.

This invention relates to a method for concrete piling and has for its object to obtain great stability and supporting ability of the individual piles while avoiding the expense of piles of uniform or substantially uniform large diameter or cross-sectional dimensions.

Figure 1:
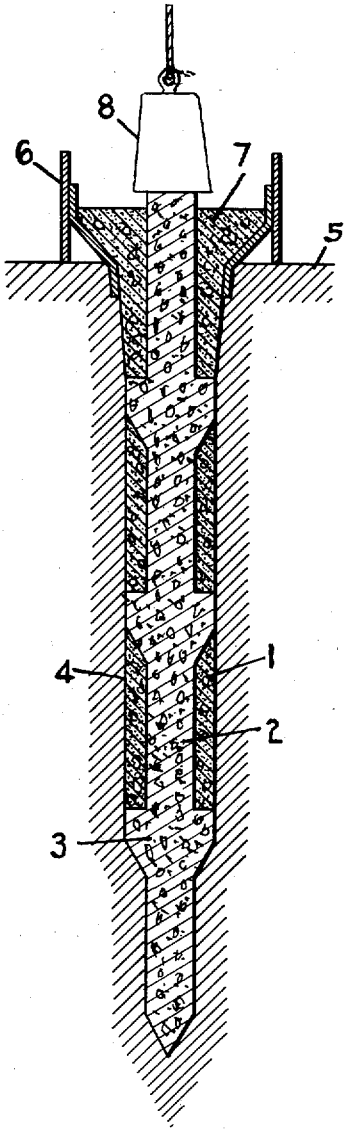
Figure 2:
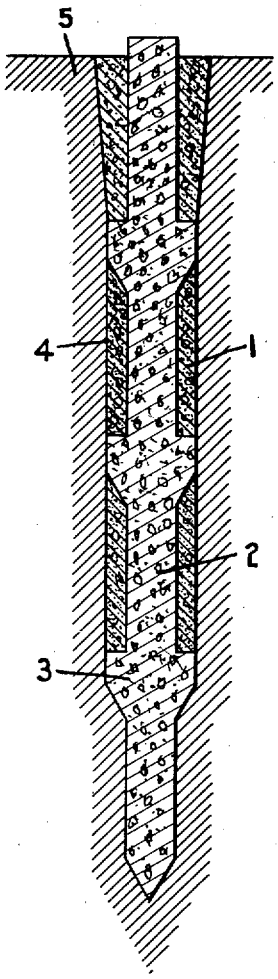

In the accompanying drawing:

Figure 1 represents a vertical section illustrating in elevation a pile as driven into the ground with the filling material shown in cross-section; and Figure 2, a view similar to Figure 1 of a pile being driven into the ground and packed or filled according to my method.

Referring to the drawing, 2 designates a preferably concrete pile having a plurality of uniform size preferably equidistantly vertically spaced annular enlargements 3 each formed with a tapering lower face or shoulder to facilitate the driving of the pile and with an upper face preferably extending at right angles to the axis of the pile to serve as a supporting face or shoulder for the packs or fills 1 of sand and/or gravel 7.

In the practice of my method a preferably funnel shaped hopper 6, with an open bottom, is disposed on the ground surface 5 and the pile 2 is driven down through the hopper 6 until the lowest annular enlargement 3 has passed through said open bottom of said hopper, the opening in which is just large enough to allow the passage of the annular shoulders 3. When the pile 2 has been driven into the ground to the degree stated, and preferably before the upper supporting face or shoulder of the lowest annular enlargement 3 passes below, or appreciably below, the bottom of the hopper 6, the latter is filled with sand and/or gravel and is kept full continuously thereafter until the pile has been completely driven in. The sand and gravel 7, being fluent material, will flow under the action of gravity down through the bottom of the hopper 6 about the pile 2 between the enlargements 3, and the jarring action of the hammer 8 in driving the pile 2 will serve to aid in maintaining the flow of such sand and/or gravel 7 and to pack the same about the pile 2 and is supported by the top or supporting face or shoulder of the said lowest annular enlargement 3 into a pack or fill 1 until the second lowest annular enlargement passes into the open bottom of the hopper 6 and closes the same against the passage of sand and/or gravel 7 therethrough until said second lowest annular enlargement 3 has moved downward until its upper supporting face or shoulder is below the bottom of the hopper 6, when the above action will be repeated, and so on until the driving of the pile 2 has been completed.

In this way the portions intervening between the annular enlargements 3 are filled in with solid well packed fills or packs 1 of a nature to contact with the opposed face of the bore 4 formed by the driving of the pile 2 with its annular enlargements 3, and said packs or fills 1 together with the annular enlargements 3 serve to maintain efficient frictional supporting contact with the opposed face of the bore 4 through the length of the pile 2.

What I claim is:

1. The method of driving and packing piling comprising the employment of a pile having a plurality of spaced enlargements, driving said pile by percussive means, arranging a supply of fluent solid filling material closely about said pile, whereby the filling material will flow down the hole about the pile as one of said enlargements moves downward below the top of said hole, filling the space above said enlargement and between said pile and the wall of said hole, until the succeeding enlargement temporarily closes the top of said hole, the vibration set up by the percussive driving means serving to promote the flow of filling material and tending to pack it between said wall and said pile.

2. The method of driving and packing piling comprising the employment of a pile having a plurality of spaced annular enlargements of uniform cross-sectional size and shape, each said enlargement having a tapering lower face and an upper annular face forming a supporting shoulder for filling material, driving said pile at a substantially uniform rate of travel by percussive means, arranging a supply of fluent solid filling material such as gravel closely about said pile, whereby the filling material will flow down the hole bored by the pile as one of said enlargements moves downward-below the top of said hole, filling the space above said enlargement and between said pile and the wall of said hole, until the succeeding enlargement temporarily closes the top of said hole, the vibration set up by the percussive driving means serving to promote the flow of filling material and tending to pack it between said wall and said pile.

3. The method of driving and packing piling comprising the employment of a pile having an enlargement, percussively driving said pile, the said enlargement forming a hole about said pile as it is driven, and flowing filling material into the hole about said pile and above said enlargement as said pile is driven.

In testimony whereof I have signed this specification this 21st day of October, 1932.

SHOJIRO TAKECHI.